United States Patent [19]

Saifi

[11] 4,304,581
[45] Dec. 8, 1981

[54] LIGHTGUIDE PREFORM FABRICATION

[75] Inventor: Mansoor A. Saifi, East Windsor Township, Mercer County, N.J.

[73] Assignee: Western Electric Co., Inc., New York, N.Y.

[21] Appl. No.: 175,982

[22] Filed: Aug. 7, 1980

[51] Int. Cl.³ ..................... C03B 37/07; C03B 37/075
[52] U.S. Cl. ..................................... 65/3.12; 427/163; 427/237
[58] Field of Search ................ 65/3.11, 3.12; 429/163, 429/237

[56] References Cited

U.S. PATENT DOCUMENTS

| | | | |
|---|---|---|---|
| 3,981,707 | 9/1976 | Araujo | 65/3.11 |
| 4,087,266 | 5/1978 | Irven et al. | 65/3.12 |
| 4,110,093 | 8/1978 | Macedo et al. | 65/3.15 |
| 4,121,919 | 10/1978 | Le Sergent et al. | 65/3 A |
| 4,145,456 | 3/1979 | Küppers et al. | 65/3.12 X |
| 4,154,591 | 5/1979 | French et al. | 65/3.11 |
| 4,165,224 | 8/1979 | Irven et al. | 65/3 A |
| 4,191,545 | 3/1980 | MacChesney et al. | 65/3.11 |
| 4,206,968 | 6/1980 | Suganuma et al. | 350/96.33 |
| 4,217,027 | 8/1980 | MacChesney et al. | 65/3.12 X |

OTHER PUBLICATIONS

Partus et al., "Lightguide Preform Manufacture", *The Western Electric Engineer*, vol. XXIV, No. 1, Winter 1980, pp. 39–47.
Akamatsu et al., "Fabrication of Graded-Index Fibers . . . ", *Applied Physics Letters*, vol. 31, No. 8, Oct. 15, 1977, pp. 515–517.

*Primary Examiner*—Richard V. Fisher
*Attorney, Agent, or Firm*—D. J. Kirk

[57] ABSTRACT

A lightguide preform (13) is fabricated by depositing and consolidating a plurality of doped silica layers (12), containing volatile germania, on the inside surface of a silica glass tube (11). The tube (11) is rotated while repeatedly traversing a hot zone therealong to shrink and collapse the tube in a final heat zone traversal. A gas mixture containing oxygen and germanium tetrachloride flow from an input gas line (23) and through the tube (11) during the shrinking traversals. The gas mixture continues to flow through at least a portion of the input gas line (23) during the final heat zone traversal.

8 Claims, 8 Drawing Figures

FIG.-7
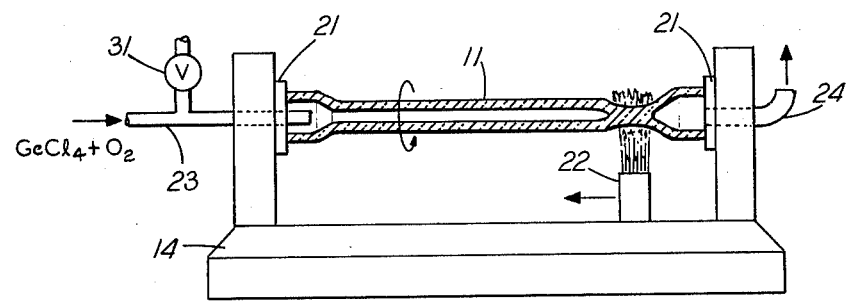
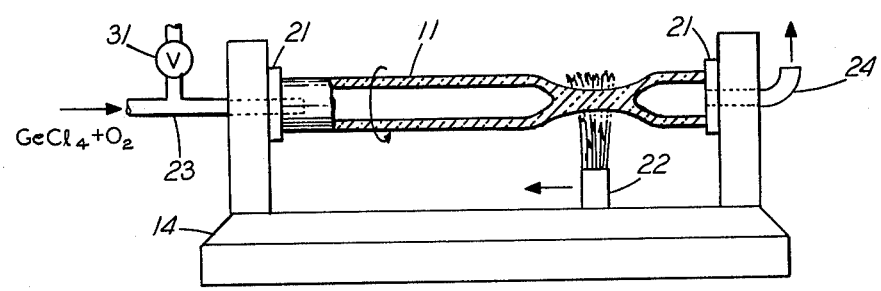
FIG-8

LIGHTGUIDE PREFORM FABRICATION

TECHNICAL FIELD

The instant invention relates to the fabrication of a lightguide fiber preform. In particular, the invention is directed to the fabrication of a step or graded index preform.

BACKGROUND OF THE INVENTION

Lightguide fiber is drawn from a solid glass cylinder, or preform. The preform having a central core surrounded by a cladding material may be fabricated by the modified chemical vapor deposition (MCVD) process which is described in an article titled "Lightguide Preform Manufacture" in the Western Electric ENGINEER, by Partus and Saifi, Vol. XXIV, No. 1, pages 39 to 47, dated 1980 which is incorporated herein by reference. Layers of fused doped silica are built-up on the inside of a long silica glass tube by the reaction of glass precursor vapors, resulting in the formation of particles which deposit and are fused on the inner wall of the tube. The composition of the reactant vapors is automatically controlled to give a step or graded index of refraction in the deposited glass layers which will form the core of the preform. When a fiber is drawn from the preform, the deposited glass becomes the lightguide fiber core and the silica glass tube becomes the fiber cladding.

In particular, vapors of materials such as $GeCl_4$, $SiCl_4$, $POCl_3$ or the like are entrained in a carrier gas such as oxygen and are drawn as a vapor stream into the interior of the glass tube which is rotated as a torch repeatedly traverses its length. As the vapor stream passes through the tube and encounters a heat zone adjacent the torch it reacts creating oxides which deposit on the interior surface of the tube. After numerous traversals of the torch along the length of the tube to deposit said layers, the tube is then subjected to elevated temperatures (e.g., 1900° to 2000° C.) by the torch in several traversals to shrink the tube and in a final traversal the tube is collapsed, resulting in a solid rod shaped preform.

A problem arises when the material of the core layers contains a volatile dopant such as germania and/or phosphorous pentoxide wherein the elevated temperatures necessary to soften the tube wall during the shrinking and collapse traversals can cause volatilization and loss of the dopant from the deposited core layers. This will undesirably change the dopant concentration therein which alters the refractive index profile of the core of the resulting preform.

U.S. Pat. No. 4,165,224 to Irven et al. attempts to solve the volatilization problem by passing a gas mixture containing oxygen and a halide or oxy-halide of the element having the volatile oxide through the tube during the shrinking traversals. At the hot zone the chloride and oxygen react to produce germania and chlorine. The germania so formed tends to dissociate and form germanium monoxide and oxygen. The excess germanium monoxide tends to drive the equilibrium volatilization reaction into reverse thereby suppressing the loss of germania from the surface region of the bore of the tube.

Although such a technique has been found to be most effective in improving the index profile of the preform core, during the collapse traversal of the tube, the flow of the halide and oxygen to the inside of the tube has been intentionally shut off, as it is no longer possible to flow gases therethrough. Accordingly, volatilization of the germanium monoxide and/or germania is allowed to take place during the collapse traversal which deleteriously alters the concentration of germania in the inner layer of the core of the lightguide preform resulting in a dip in the refractive index.

SUMMARY OF THE INVENTION

The foregoing problem has been overcome by a technique for fabricating a lightguide preform wherein a plurality of doped glass layers, containing a volatile oxide of an element, are deposited on the inside surface of a glass tube. A heat zone then repeatedly traverses the length of the tube at an elevated temperature to shrink and finally collapse the tube in final heat zone traversal. A gas mixture, containing oxygen and a halide or an oxy-halide of the element flows from an input gas line, through the tube during the shrinking traversals. The gas mixture continues to flow within at least a portion of the input gas line during the final heat zone traversal.

Advantageously such a technique results in substantial elimination of the index dip in the index profile of the core of the resultant preform.

BRIEF DESCRIPTION OF THE DRAWINGS

FIG. 7 is a schematic view of the preform during the collapse pass; and

FIG. 8 is a further embodiment of the instant preform fabrication process.

DETAILED DESCRIPTION

Figure 1:
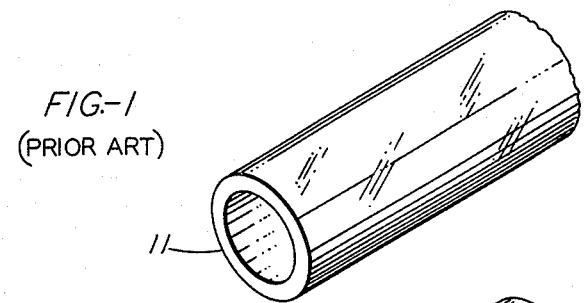
FIGS. 1 to 3 depict the steps in the formation of a lightguide preform.
Figure 2:
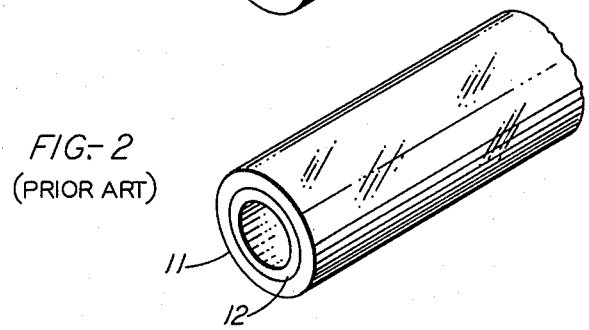
Figure 3:
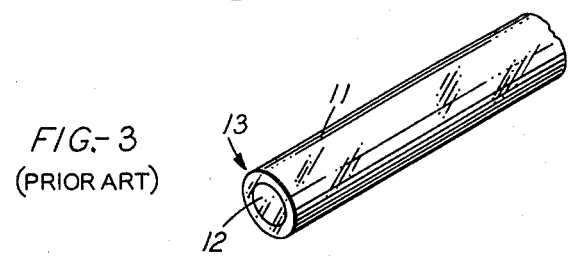

FIGS. 1 to 3 generally set forth the steps in the preform manufacture by the aforementioned Modified Chemical Vapor Deposition (MCVD) process. FIG. 1 depicts a portion of a silica glass tube 11 having a wall thickness of approximately 2 mm, an outside diameter of 16 mm and a length of about 100 cm. FIG. 2 shows the tube 11 having a plurality of doped layers 12 deposited on the inside wall thereof, the layers each have substantially the same index of refraction when fabricating a preform having a step index profile and the index increases in subsequent deposited layers when fabricating a preform having a graded index profile. FIG. 3 shows the tube 11 with the deposited layers therein after it has been collapsed to form a solid lightguide preform 13 from which a lightguide fiber can be drawn.

Figure 4:
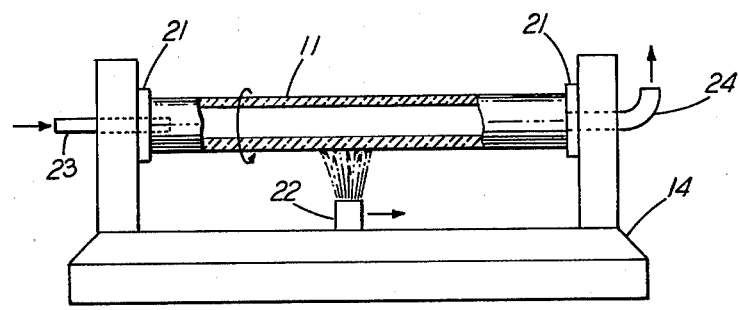
FIG. 4 shows a glass lathe used in the fabrication of a lightguide preform.

FIG. 4 is a schematic drawing of a glass working lathe 14 used to fabricate the lightguide preform 13. The starting glass tube 11 is mounted between synchronous rotatable chucks 21—21. As the tube 11 is rotated it is heated by a gas oxygen burner 22 which repeatedly traverses its length slowly from left to right and makes a fast return to the left after each traversal. Reactant vapors and gas pass through an input gas line 23 and into the interior of the tube 11. As the reactant vapor encounters the heat zone (approximately 1500° to 1600°

C.) caused by the burner 22 oxides are created which deposit ahead of the heat zone on the cooler surface on the inside of the tube 11. Vapor and particles not deposited will pass through the exhaust tube 24. A plurality of such traversals (e.g., 50) are accomplished until a predetermined thickness of the layer 12 has been attained.

Then the tube 11, with the doped glass layers 12, is heated to an elevated temperature (e.g., 1900° to 2000° C.) to cause the tube to soften, shrink and finally collapse to form the solid lightguide preform 13 as shown in FIG. 3. This is accomplished by elevating the temperature of the burner 22 to provide a localized heat zone which is slowly traversed (e.g., 0.5 to 2 mm/sec) along the tube 11 to effect localized softening of the tube wall. A number of traversals (e.g., 6) of the elevated heat zone along the length of the tube 11 progressively shrinks the diameter of the tube until, on a final collapse traversal which moves the heat zone from the right to the left, the tube, with the layers 12 therein, is completely collapsed to form the solid preform 13.

A problem occurs when the core material contains a volatile dopant such as germania, phosphorous pentoxide or the like. The elevated temperatures necessary to soften the wall of the tube 11 may also cause appreciable volatilization and loss of the volatile dopant from the deposited layers 12, thereby altering the refractive index profile of the resulting preform 13.

The above-referred to Irven et al. patent is directed to minimizing such volatilization of such dopants by passing a mixture of oxygen and a halide of the volatile dopant through the tube 11 during the shrinking traversals. In particular, when collapsing a silica tube 11 internally lined with germania doped silica layers 12, germanium tetrachloride and oxygen are passed, from an input gas line 23, through the tube 11 during the shrinking traversals. This technique suppresses the loss of germania from the surface region of the deposited layers 12 of the tube 11 and provides a substantially flat concentration of germania of about 12 wt. % with a slight residual dip approaching 0 wt. % (FIG. 5) when fabricating a step index preform 13. The residual dip appears to be due to the fact that during the final collapse traversal, the germanium tetrachloride is precluded from flowing through the tube 11 upon initial closure thereof (see FIG. 7). Heretofore the flow of germanium tetrachloride has been shut off during the collapse traversal resulting in some volatilization of the germania from the inner surface of the wall of the tube 11.

Figure 6:
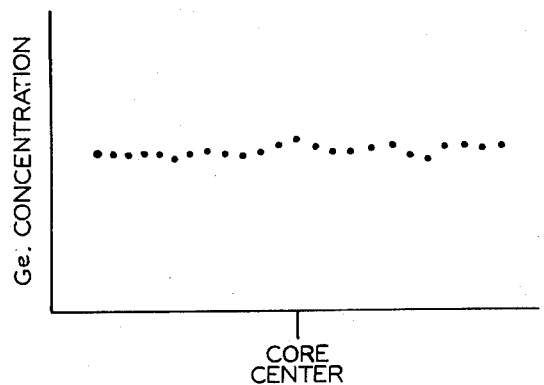
FIG. 6 represents the germania concentration in the core of a step index preform using the instant technique.

I have discovered that continuing the flow of germanium tetrachloride and oxygen through a regulating valve 31 in at least a portion of the input gas line 23 during the collapse traversal results in substantially complete removal of the dip in the germania concentration level of about 12 wt. % (FIG. 6) which is directly reflected in the refractive index profile of the preform 13. Exemplary apparatus used to implement my invention is shown in FIG. 7 which depicts the initiation of the collapse traversal wherein the torch 22 moves from the exhaust tube 24 towards the gas input line 23 and the torch temperature is approximately 2000° C. The size of the bore opening of the tube 11 is decreased or shrunk during the plurality of traversals to a diameter of about 3 mm prior to the collapse traversal.

Figure 5:
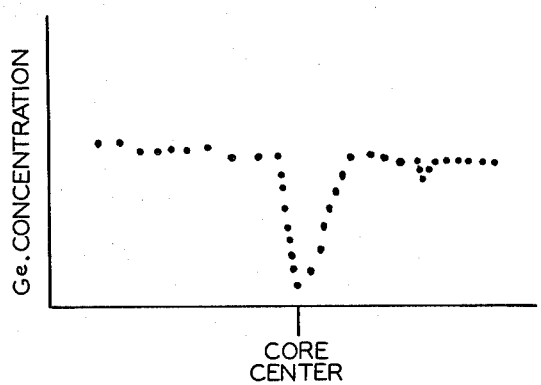
FIG. 5 represents the germania concentration in the core of a step index preform using prior art fabrication techniques.

Although the mechanism is not fully understood it appears that discontinuing the flow of germanium tetrachloride vapor in the input gas line 23 may have resulted in volatilization of germania from the final layer 12 deposited in the tube 11, resulting in the index dip shown in FIG. 5. It is believed that by maintaining the flow of germanium tetrachloride and oxygen through at least a portion of the input gas line 23 any vapor diffusing and/or flowing from that line into the bore, as the tube 11 collapses, will contain germanium tetrachloride resulting in a steady state germanium tetrachloride and $GeO_2$ environment in the bore of the tube 11. Such an environment has been found to substantially eliminate the loss of germania from the last deposited layer 12 in the tube 11.

In a further exemplary embodiment of the instant invention, once the layers 12 have been deposited a portion of the tube 11 is collapsed near the end opposite the gas input line 23 as shown in FIG. 8. The torch 12, providing the elevated temperature, is then moved toward the input line 23 and then returned quickly to the right. Such a traversal is then repeated (approximately six traversals) to shrink and finally collapse the tube 11. During these traversals, germanium tetrachloride cannot pass through the tube 11 but the flow thereof through a portion of the input gas line 21 is continued by opening the valve 11. Such a technique has been found to substantially decrease the refractive index dip of the core of the resultant preform 13.

It is to be understood that the embodiments described herein are merely illustrative of the principles of the invention. Various modifications may be made thereto to persons skilled in the art which will embody the principles of the invention and fall within the spirit and scope thereof. For instance, the instant invention is not limited to preforms fabricated by the MCVD process. Any method wherein glass layers, having a volatile dopant therein, are deposited on the inside surface of a glass tube which is to be collapsed to form a lightguide preform can be fabricated using the instant techniques.

What is claimed is:

1. A method of fabricating a lightguide preform, comprising the steps of:
    depositing a plurality of doped glass layers, containing a volatile oxide of an element, on the inside surface of a glass tube;
    repeatedly traversing a heat zone along the tube to shrink and finally collapse the tube in a final heat zone traversal;
    flowing a gas mixture, containing a halide or an oxyhalide of the element from an input gas line, through the tube during the shrinking traversals; and
    continuing the flow of said gas mixture within at least a portion of the input gas line during the final heat zone traversal.

2. The method as set forth in claim 1, wherein the element is germania.

3. The method as set forth in claim 1, wherein the gas mixture contains germanium tetrachloride.

4. A method of fabricating a lightguide preform, comprising the steps of:
    depositing and consolidating a plurality of doped silica glass layers, containing volatile germania, on the inside surface of a silica glass tube;
    rotating the tube while repeatedly traversing a heat zone therealong to shrink and finally collapse the tube in a final heat zone traversal;
    flowing a gas mixture, containing oxygen and germanium tetrachloride via an input gas line, through the tube during the shrinking traversals; and continuing the flow of said gas mixture within at least a portion of the input gas line during the final heat zone traversal.

5. A method of fabricating a lightguide preform comprising the steps of:

depositing and consolidating at least one germania doped silica glass layer on the inside surface of silica glass tube;

repeatedly traversing a heat zone slowly along the outside surface of the tube in a first direction to decrease the tube diameter;

traversing the heat zone in the opposite direction to collapse the tube;

flowing a mixture of germanium tetrachloride from an input gas line, through the tube, in the direction of the movement during the tube diameter decreasing traversals; and continuing the flow of said mixture within at least a portion of the input gas line during the final collapse traversal.

6. A method of fabricating a lightguide preform, comprising the steps of:

flowing reactant gases from an input gas line through a glass tube while repeatedly traversing a hot zone therealong to cause a plurality of doped glass layers, containing a volatile oxide of an element, to deposit on the inside surface of the tube;

elevating the temperature of the hot zone to collapse a portion of the glass tube at an end opposite the gas input line;

repeatedly traversing the heat zone along the tube, from the collapsed portion towards the input gas line, to shrink and collapse the tube; and flowing a gas mixture, containing oxygen and a halide or an oxy-halide of the element in at least a portion of the input gas line during the shrinking and final collapse traversals.

7. The method as set forth in claim 6, wherein the element is germania.

8. The method as set forth in claim 6, wherein the gas mixture contains germanium tetrachloride.

* * * * *